(12) United States Patent
Peters

(10) Patent No.: US 11,231,065 B2
(45) Date of Patent: Jan. 25, 2022

(54) THERMAL INSULATING FASTENER AND ASSEMBLY

(71) Applicant: Jeffrey Scott Peters, Troutdale, OR (US)

(72) Inventor: Jeffrey Scott Peters, Troutdale, OR (US)

(*) Notice: Subject to any disclaimer, the term of this patent is extended or adjusted under 35 U.S.C. 154(b) by 209 days.

(21) Appl. No.: 16/738,646

(22) Filed: Jan. 9, 2020

(65) Prior Publication Data
US 2021/0215192 A1 Jul. 15, 2021

(51) Int. Cl.
| | |
|---|---|
| *E01B 9/12* | (2006.01) |
| *F16B 43/00* | (2006.01) |
| *F16B 5/00* | (2006.01) |
| *F16B 33/00* | (2006.01) |

(52) U.S. Cl.
CPC ............ *F16B 43/001* (2013.01); *F16B 5/002* (2013.01); *F16B 33/004* (2013.01)

(58) Field of Classification Search
CPC ...... F16B 43/001; F16B 5/002; F16B 33/004; E04B 2/0409; E04B 2/7407; E04B 2/46; E04B 2/30; E04B 2/28; E04B 2/721; E04B 2/7403
USPC ..... 411/337; 52/582.2, 584.1, 489.2, 506.06, 52/506.08
See application file for complete search history.

(56) References Cited

U.S. PATENT DOCUMENTS

| | | | |
|---|---|---|---|
| 4,008,552 A | 2/1977 | Biebuyck | |
| 4,471,593 A * | 9/1984 | Ragland | E04B 2/7403 52/489.2 |
| 5,245,811 A * | 9/1993 | Knorr | E04B 2/7409 403/382 |
| 5,839,867 A * | 11/1998 | Schmucki | E03D 11/143 411/337 |
| 6,055,099 A * | 4/2000 | Webb | G02B 6/43 359/435 |
| 6,101,780 A * | 8/2000 | Kreidt | E04B 1/2608 52/281 |
| 6,260,324 B1 * | 7/2001 | Miedema | E04B 2/7437 52/239 |
| 6,591,557 B1 | 7/2003 | Thomsen et al. | |
| 6,655,099 B1 * | 12/2003 | Trenoweth | E04B 1/34315 52/243 |
| 8,173,881 B1 * | 5/2012 | Schenk | G10G 7/02 84/312 R |

(Continued)

FOREIGN PATENT DOCUMENTS

| | | |
|---|---|---|
| CA | 2514829 | 8/2005 |
| CA | 2763058 | 3/2012 |

(Continued)

OTHER PUBLICATIONS

Cascadia Windows & Doors; "Cascadia Clip"; https://www.cascadiawindows.com/products/cascadia-clip ; 1 page.

(Continued)

*Primary Examiner* — Gary W Estremsky
(74) *Attorney, Agent, or Firm* — Chernoff Vilhauer LLP

(57) ABSTRACT

A fastener and an assembly for making space and adding support between external and internal building components, both serving as and creating a thermal barricade between building components, where the fastener saves time and significant cost in the construction process.

12 Claims, 6 Drawing Sheets

(56) References Cited

U.S. PATENT DOCUMENTS

| | | | |
|---|---|---|---|
| 8,250,827 B2* | 8/2012 | Lin | E04B 1/2612 |
| | | | 52/702 |
| 8,544,229 B2* | 10/2013 | Kilgore | E04F 15/02044 |
| | | | 52/489.2 |
| 9,174,826 B1* | 11/2015 | Nieves | B66B 11/0253 |
| 9,493,941 B2* | 11/2016 | White | F25D 23/085 |
| 9,809,976 B2* | 11/2017 | Sareyka | E04B 9/127 |
| 2009/0241444 A1 | 10/2009 | Griffiths | |
| 2009/0272055 A1 | 11/2009 | Griffiths | |

FOREIGN PATENT DOCUMENTS

| | | |
|---|---|---|
| DE | 102004025760 | 12/2005 |
| DE | 202009007782 | 9/2009 |
| WO | 2016100514 | 6/2016 |

OTHER PUBLICATIONS

"ISO Clip" https://www.brockwhite.com/iso-clip ; 1 page.
"ISO CLip: Thermal Isolation Clip" http://hycombusa.com/iso-clip ; 4 pages.

* cited by examiner

THERMAL INSULATING FASTENER AND ASSEMBLY

CROSS REFERENCE TO RELATED APPLICATIONS

None.

BACKGROUND OF THE INVENTION

The present invention generally relates to a fastener and to an assembly for making space between building components and providing additional structural support, while also acting as a thermal barricade between building components and regulating and reducing unwanted heat loss and heat transfer.

Over the past few years, building requirements, codes and regulations have become increasingly stringent in the construction industry. An area that is quickly becoming a main focus involves construction and development sustainability, energy efficient building structures.

For construction projects, cladding is often applied as an exterior layer, used not only for aesthetic purposes, but also to provide for thermal insulation and protect against weathering. Thermal insulation refers to the reduction of heat transfer between objects of varying temperature. Cladding can be installed using various connectors, which in turn are attached to interior building structures such as panels, subframes, or columns. When the connectors are in place, the additional layer of air formed by the connectors between the cladding and the interior building structure serve to insulate and reduce heat loss. In addition to the air cavity layer between the cladding and the building interior, the connectors themselves can also reduce heat transfer and various systems have been developed.

Aside from having thermal insulative properties, there is also a need to develop construction components that are easy-to-use, quick-to-install, while also remaining cost-competitive. It is known that delays are frequent in construction, some reasons may include planning, insufficient resources, or materials arriving late. While time is of the essence, building components, in particular the aforementioned connectors, still need to possess sufficient strength and rigidity to withstand the weight and pressure of cladding and other exterior components, minimize and prevent potential weather damage, as well as maintain the insulation layer and overall structural integrity of the building.

What is desired, therefore, is a fastener that can connect the exterior and interior building components, where the fastener provides an insulative layer through creating an insulative air barrier but also possesses thermal breaking properties itself, is easy to use, reduces installation time, and remains cost-efficient.

BRIEF DESCRIPTION OF THE DRAWINGS

For a better understanding of the invention, and to show how the same may be carried into effect, reference will now be made, by way of example to the accompanying drawings, which.

DETAILED DESCRIPTION OF PREFERRED EMBODIMENTS

Figure 1:
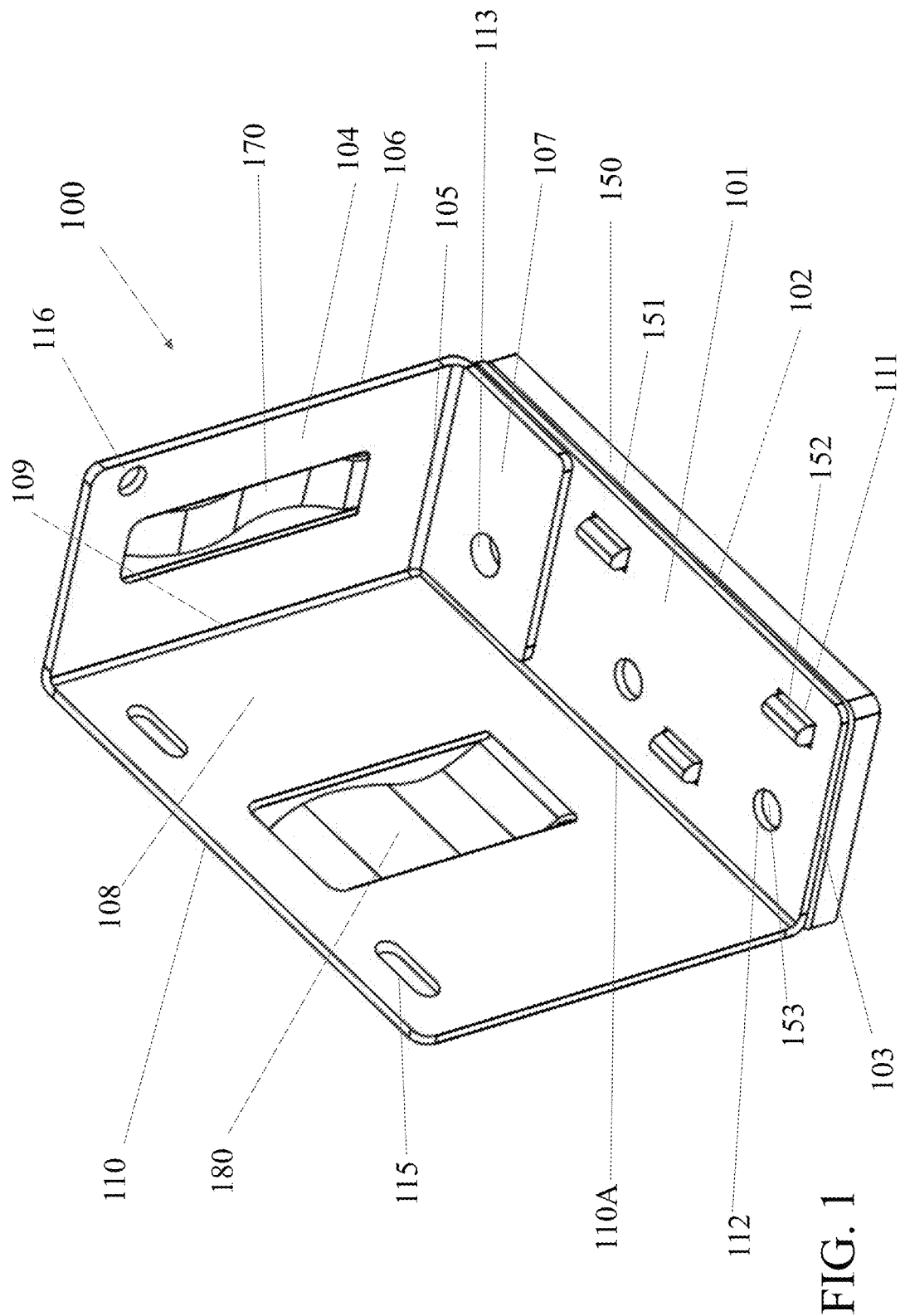
FIG. 1 shows a perspective view of an exemplary embodiment of the present invention.

Referring to FIG. 1, an illustrative example of a fastener assembly 100 is shown, which can be used to connect the exterior building components (e.g., cladding) and interior building components (e.g., subframe, dry wall, panels, columns), and create an thermally insulative layer that may be air. In some embodiments, the fastener 100 includes a generally rectangular base panel 101, a generally rectangular end panel 104, and a generally rectangular side panel 108. As shown in FIG. 1, the end panel 104 may be perpendicularly attached to the base panel 101, allowing the base panel to share the same short side 105 with the end panel 104. In a preferred embodiment, a side panel 108 may also be perpendicularly attached to the base panel 101, allowing the base panel 101 to share the same long side 110A with the side panel 108. The end panel 104 and the side panel 108 may be adjoined to each other perpendicularly and share a common side 109.

Figure 2:
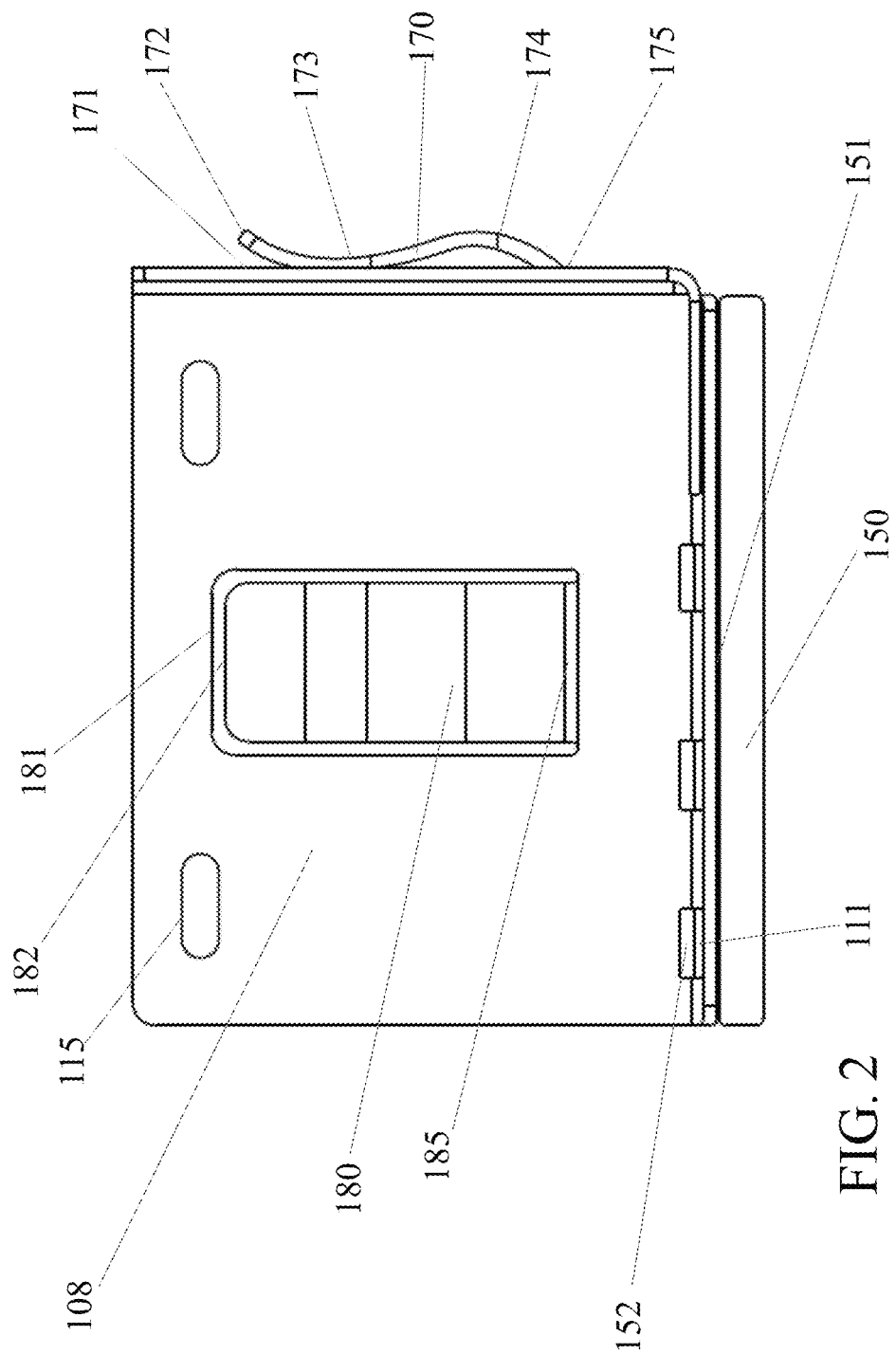
FIG. 2 shows a side view of the fastener of FIG. 1.
Figure 3:
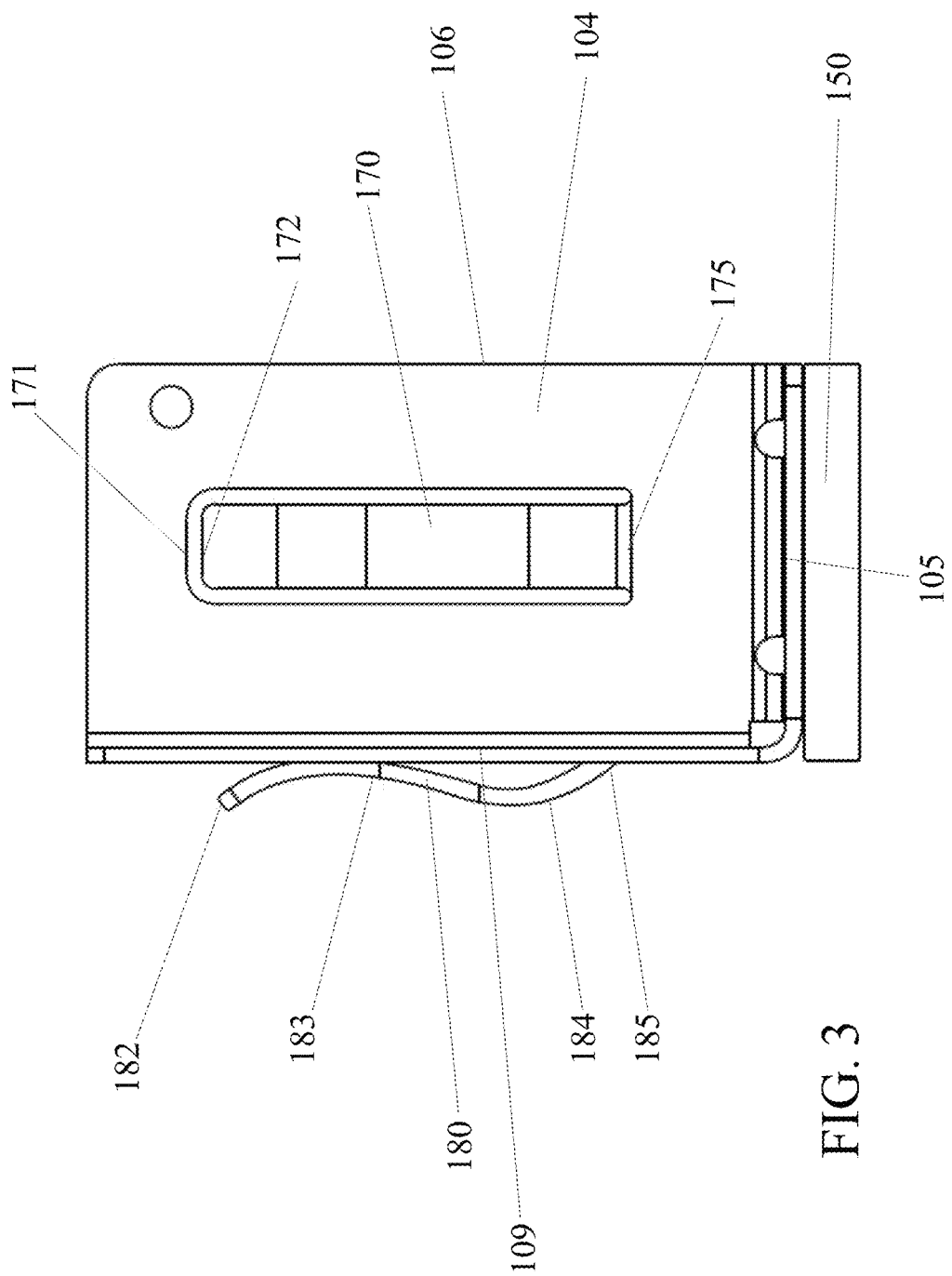
FIG. 3 shows a top view of the fastener of FIG. 1.

Referring to FIGS. 1-3, in some embodiments, the fastener 100 may have a plate 150 with a uniform thickness that may be directly positioned parallel to the base panel 101 in a face-to-face abutment. The plate 150 may be rectangular in size with dimensions in length and width similar to that of the base panel 101. In the preferred embodiment, to aid in the secure assembly when positioning the plate parallel to the base panel so as to use the two together as a thermal insulating fastener, the plate may have rectangular teeth 152 extending upwards from the plate surface 151, where the teeth largely fit into corresponding rectangular apertures 111 of the same length and width in the base panel. The base panel may have multiple receiving cut outs 111 or recesses to receive the teeth of the plate to hold the plate in position.

As shown in FIG. 1, in some embodiments, the base panel 101 and plate 150 may have circular holes 112, 153 made along the surface that correspond in diameter and placement so that threaded members and other materials may pass through faster and accurately when the plate is placed adjacent to the base panel.

In some embodiments, the end panel 104 may have a short portion and a long portion, where the short portion of the end panel 107 may extend over the interior surface of the base panel 101, and be parallel to the base panel 101, and the long portion of the end panel may be perpendicular to the base panel 101.

As shown in FIG. 1, in some embodiments, the short portion of the end panel 107 may have circular holes 113 that also correspond in diameter and placement with circular holes made on the surface of the base panel and adjacent plate 114, 154 so that threaded members and other components connecting the fastener 100 and the interior building materials may pass through the short portion of the end panel, the base panel, and the thermal barrier plate.

In a preferred embodiment, the base 101, end 104 and side 108 panels may be made from metal such as steel or aluminum, or other similar types of material in strength and durability so that the panels withstand climatic elements, and bear the brunt of the weight of the building exterior. In another preferred embodiment, the plate 150 may be constructed from molded plastic, or any other material of sufficient durability and strength to withstand the pressure from the base panel 101 positioned on top. The plate should also be hardy enough to hold when construction components like threaded members are engaged with the plate and passing through. The plate 150 can be made generally from any material that has a lower thermal conductivity that the material of the base panel 101, so that the plate 150 stifles the process of heat gain or loss caused by the difference in temperatures between the base panel and interior building components. When the fastener 100 is used, the direction in which the heat flows may be inward, outward, or any other direction.

Referring to FIGS. 2-3, in some embodiments, there may be an S-shaped flap 170, 180 partially carved out from a hole on the end 104 and/or side 108 panels. The flap may have a curvature that bends away from the panels where the flap is cut from, creating a channel between the tip of the flap 172, 182 and the portion of the panel 171, 181. In a preferred embodiment, the base portion 175 of the flap 170 adjacent to the end panel may be closer in proximity to the base panel 101 than the opposing opening portion of the flap 171.

Referring to FIGS. 2-3 and 5-6, the S-shaped flap 170, 180 can be used to clip and mount building components, such as studs, frames, walls, and beams. The present inventor discovered that having the S-shaped flaps allows for quicker and more efficient and accurate mounting and installation of building components in the construction process, as the curvature of the flap, in particular, at the end or tip of the flaps 172, 182 create additional space by bending away from the panels and allow for building components to slidably engage with the fasteners 100 and 200.

When slidably engaged with a building component, the portion 173, 183 of the curvature of the flaps 170, 180 that are closest to the end and side panels in proximity and contact also create additional spring pressure due to the curvature direction, and allow the flap 170 clasp onto the building component more effectively. The additional spring pressure helps hold the materials in place and creates less room for error, lessens the need for measuring, and saves time.

Referring to FIGS. 2-3 and 5-6, in a preferred embodiment, the S-shaped curvature of the flaps 170, 180 will bend away once more from the panels and create another additional space 174, 184 between the portions 173 and 175 of the flaps, before the flaps reach their connected end with the panels 175, 185. The second opening allows for building components to slidably engage with the fasteners, to their fullest extent. When building components are slidably engaged, the additional space 174, 184 from the S-shaped curvature lowers the friction generated between the building components and the flaps 170, 180, and allows for some flexibility for error. Because of the spring energy exerted by portions 173, 183 of the curvature of the flaps, the components remained firmly grasped by the flaps 170, 180. Additionally, because the flaps 170, 180 are created as a partial cut out from the body of the end and side panels themselves, this invention uses less materials, creates less construction waste, and ultimately saves construction cost.

Figure 4:
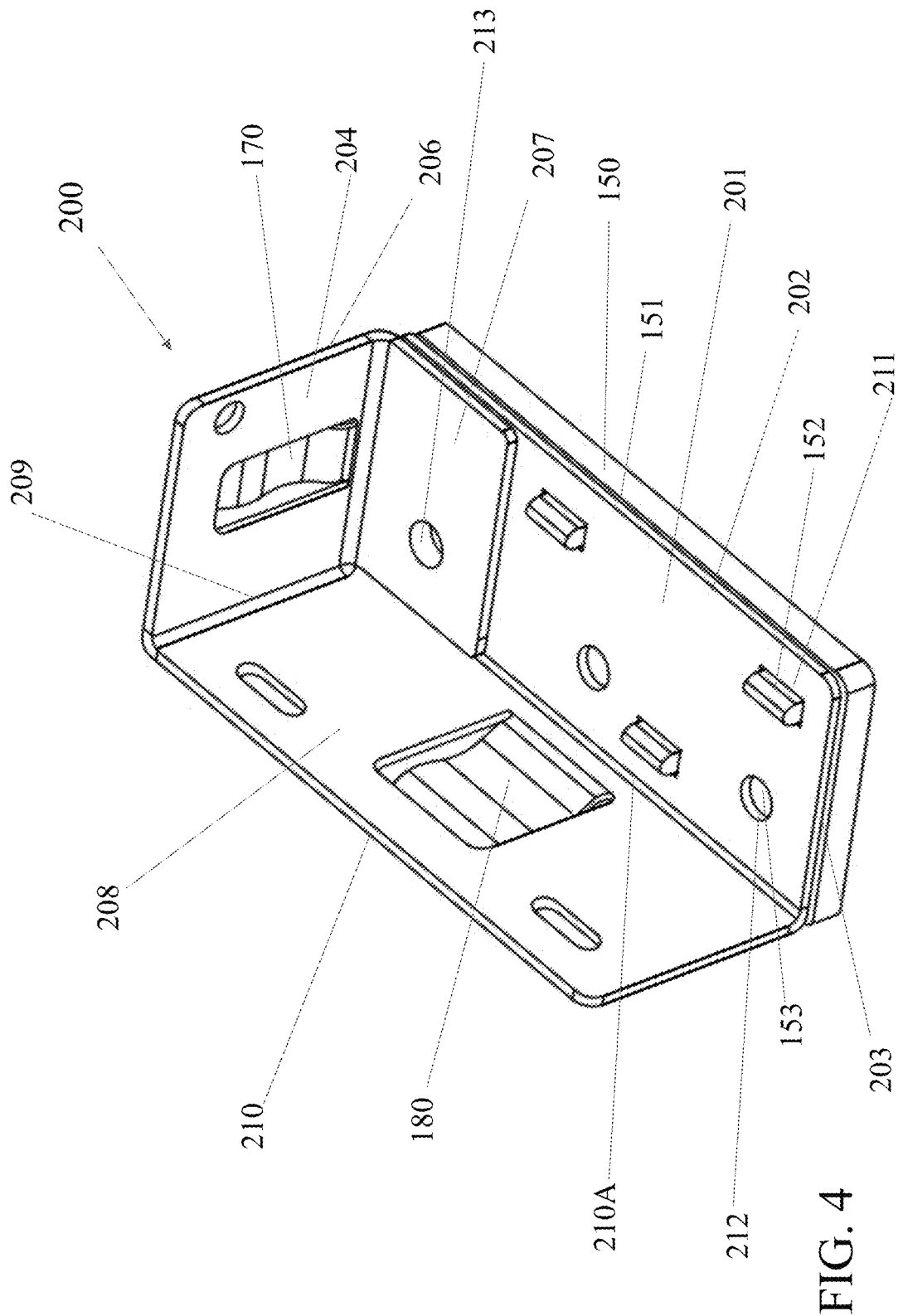
FIG. 4 shows a perspective view of an alternate exemplary embodiment of the present invention.
Figure 5:
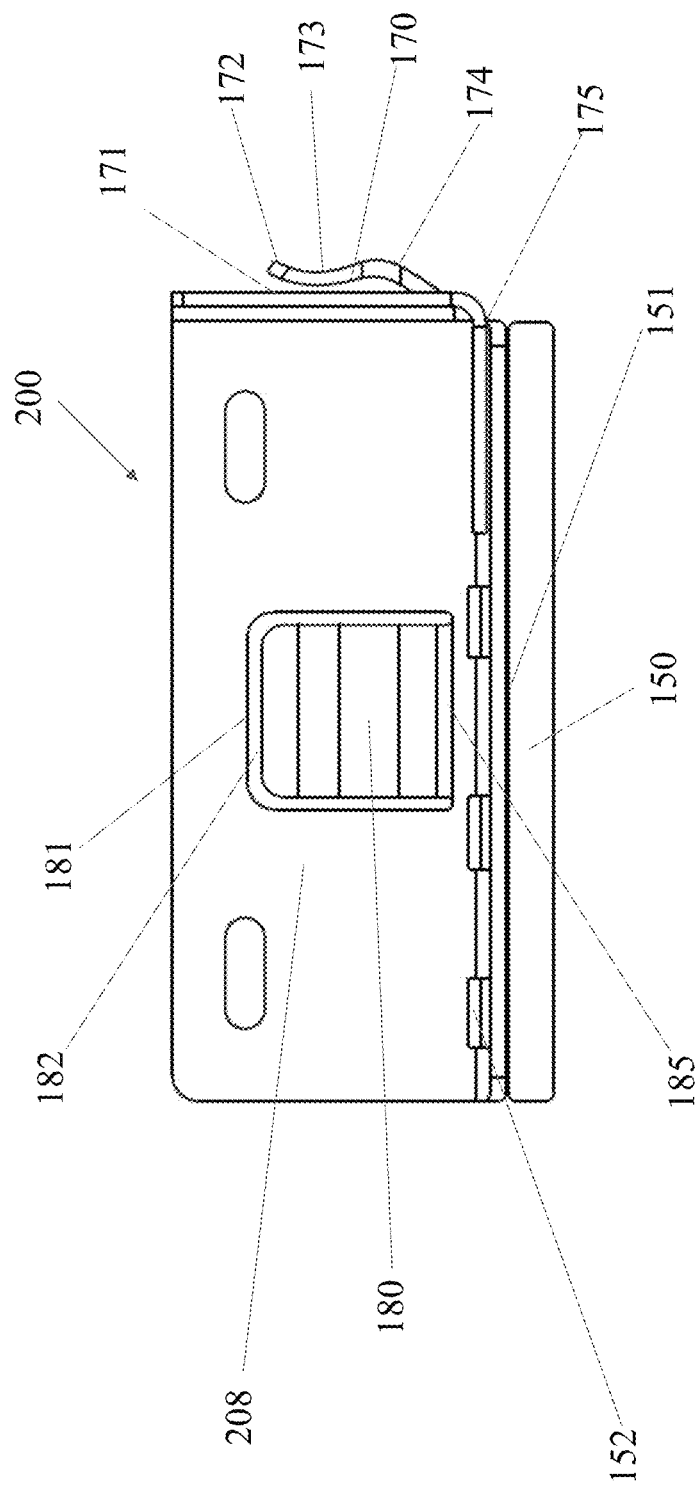
FIG. 5 shows a side view of the fastener of FIG. 4.
Figure 6:
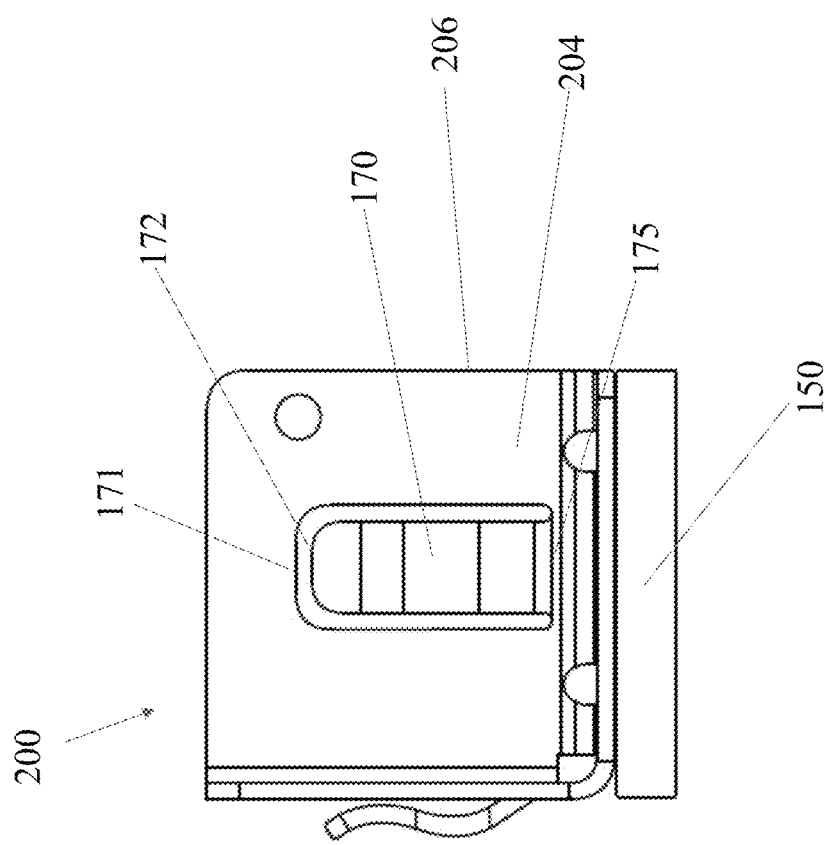
FIG. 6 shows a top view of the fastener of FIG. 4.

Referring to FIG. 4, an alternative example of a fastener 200 is shown, where the end panel 204 generally resembles a square, so that the fastener 200 can attach to building components of different dimensions compared to the fastener in FIG. 1. In this preferred embodiment where the end panel 204 resembles a square, the insulative layer created when using the fastener 200 between the external and internal building components is thinner, due to the length of the fastener sides 206 and 209.

It will be appreciated that the invention is not restricted to the particular embodiment that has been described, and that variations may be made therein without departing from the scope of the invention as defined in the appending claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

What is claimed is:

1. A thermal insulation fastener, comprising:
    (a) a rectangular base panel;
    (b) an end panel perpendicularly attached to, or formed with, one of the short sides of said base panel, said end panel having a first rectangular hole;
    (c) a first s-shaped flap attached to, or formed with, the end panel, the first s-shaped flap being disposed generally parallel to and adjacent the first hole of the end panel, where the first s-shaped flap includes opposed first and second end portions, the first end portion is adjacent to the base panel and spaced from the second end portion, the first s-shaped flap and first hole defining a first receiving channel therebetween;
    (d) a rectangular side panel perpendicularly attached to, or formed with, both a long side of said base panel, and a long side to said end panel, said side panel having a second rectangular hole;
    (e) a second s-shaped flap attached to, or formed with, the side panel, the second s-shaped flap being disposed generally parallel to and adjacent the second hole of the side panel, where the second s-shaped flap includes opposed third and fourth end portions, the third end portion is adjacent to the base panel and spaced from the fourth end portion, the second s-shaped flap and the second hole defining a second receiving channel therebetween; and
    (f) a rectangular plate selectively attached to the base panel, the rectangular plate is parallel to the base panel.

2. The fastener of claim 1 wherein said end panel is a rectangle.

3. The fastener of claim 1 where in said end panel is a square.

4. The fastener of claim 1 wherein a portion of said end panel folds over the surface of the base panel, opposite to the surface of the base panel that is attached to the plate.

5. The fastener of claim 1 wherein said plate is substantially the same as the length and width of the base panel.

6. The fastener of claim 1 wherein said base panel includes apertures and said plate defines teeth that correspond to the apertures, wherein the teeth extend through the apertures of the base panel when said plate is attached to the base panel.

7. The fastener of claim 1 wherein said plate is constructed of material that is less thermally conductive than the base, end and side panels.

8. The fastener of claim 1 wherein said base, end and side panels are constructed from a unitary material.

9. The fastener of claim 1 wherein said base panel and plate include corresponding holes to permit threaded members to pass through both base panel and plate, when said plate is attached to the base panel.

10. The fastener of claim 1 wherein said plate is constructed of plastic.

11. The fastener of claim 1 wherein said base, end and side panels are constructed of metal.

12. A thermal insulation fastener, comprising:
(a) a rectangular base panel;
(b) a rectangular end panel attached to, or formed with, one of the short sides of said base panel, said end panel having a first rectangular hole, a short portion and a long portion, where the short portion of the end panel folds over, is attached and parallel to the base panel, and the long portion of the end panel is perpendicular to the base panel;
(c) a first s-shaped flap attached to, or formed with, the end panel long portion, the first s-shaped flap being disposed generally parallel to and adjacent the first hole of the end panel, where the first s-shaped flap includes opposed first and second end portions, the first end portion is attached to, or formed with, a short side that partially defines the first hole of the end panel and the second end portion is unattached, the first s-shaped flap and first hole defining a first receiving channel therebetween;
(d) a rectangular side panel perpendicularly attached to, or formed with, both a long side of said base panel, and a long side to said end panel, said side panel having a second rectangular hole;
(e) a second s-shaped flap attached to, or formed with, the side panel, the second s-shaped flap being disposed generally parallel to and adjacent the second hole of the side panel, where the second s-shaped flap includes opposed third and fourth end portions, the third end portion is attached to, or formed with, a short side that partially defines the second hole of the side panel and the fourth end portion is unattached, the second s-shaped flap and the second hole defining a second receiving channel therebetween;
(f) a rectangular plate selectively attached to the base panel, the rectangular plate is parallel to the base panel and substantially the same as the length and width of the base panel, the plate is constructed of material that is less thermally conductive than the base, end and side panels;
wherein said base panel includes apertures and said plate includes teeth that correspond to the apertures, the teeth extending through the apertures of the base panel when said plate is attached to the base panel, and said short portion of the end panel, said base panel and plate include corresponding holes to permit threaded members to pass through the short portion of the end panel, the base panel and the plate when said plate is attached to the base panel.

* * * * *